US008913298B2

(12) United States Patent
Ohira

(10) Patent No.: US 8,913,298 B2
(45) Date of Patent: Dec. 16, 2014

(54) IMAGE PROCESSING APPARATUS THAT SETS A SPATIAL FREQUENCY OF A CHROMATIC FOREGROUND IMAGE OF A WATERMARK TO BE LOWER THAN A SPATIAL FREQUENCY OF AN ACHROMATIC FOREGROUND IMAGE OF A COMPARABLE WATERMARK, ASSOCIATED IMAGE FORMING APPARATUS, IMAGE PROCESSING METHOD AND RECORDING MEDIUM

(75) Inventor: Masakazu Ohira, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 95 days.

(21) Appl. No.: 13/306,655

(22) Filed: Nov. 29, 2011

(65) Prior Publication Data

US 2012/0133993 A1 May 31, 2012

(30) Foreign Application Priority Data

Nov. 30, 2010 (JP) ................. 2010-267242

(51) Int. Cl.
*H04N 1/40* (2006.01)
*H04N 1/405* (2006.01)
*H04N 1/52* (2006.01)
*H04N 1/00* (2006.01)
*H04N 1/387* (2006.01)

(52) U.S. Cl.
CPC ............... *H04N 1/52* (2013.01); *H04N 1/405* (2013.01); *H04N 1/00883* (2013.01); *H04N 1/387* (2013.01)
USPC ........................................ 358/3.28; 358/534

(58) Field of Classification Search
CPC ........................ G03G 21/043; H04N 1/00883
See application file for complete search history.

(56) References Cited

U.S. PATENT DOCUMENTS

| 4,176,859 A * | 12/1979 | Giordano ................. 283/70 |
| 2004/0051885 A1 * | 3/2004 | Matsunoshita ............ 358/1.9 |
| 2006/0228045 A1 | 10/2006 | Sakai |
| 2008/0024801 A1 * | 1/2008 | Satoh et al. ............. 358/1.9 |
| 2008/0310873 A1 * | 12/2008 | Ono ....................... 399/74 |
| 2009/0185225 A1 * | 7/2009 | Kobayashi ............... 358/1.18 |

FOREIGN PATENT DOCUMENTS

| JP | 63-107369 A | 5/1988 |
| JP | 2006-229315 A | 8/2006 |
| JP | 2006-295560 A | 10/2006 |
| JP | 2007-088763 A | 4/2007 |
| JP | 2007-97130 A | 4/2007 |
| JP | 2010-183313 A | 8/2010 |

* cited by examiner

*Primary Examiner* — Fred Guillermety
*Assistant Examiner* — Christopher D Wait
(74) *Attorney, Agent, or Firm* — Birch, Stewart, Kolasch & Birch, LLP

(57) ABSTRACT

Original image data obtained by reading an original is joined with watermark data associated with a watermark for copy control, which appears as a result of making a copy. The watermark generating section sets the spatial frequency of a chromatic halftone pattern of a foreground, which appears as a result of making a copy, lower than the spatial frequency of an achromatic halftone pattern of a foreground, which appears as a result of making a copy. Accordingly, it becomes more difficult to recognize a foreground in an original document when the foreground is generated using an achromatic color, while a foreground in the duplication is recognized clearly when the foreground is generated using a chromatic color.

5 Claims, 11 Drawing Sheets

LOW LINE FREQUENCY   HIGH LINE FREQUENCY   LOW LINE FREQUENCY

CLUSTERED SMALL DOT PATTERN     ILLEGAL COPY WARNING PATTERN DATA     DISPERSED LARGE DOT PATTERN

CLUSTERED SMALL DOT PATTERN     DISPERSED LARGE DOT PATTERN

WATERMARK DATA

DITHER MATRIX

6 PIXELS

RESOLUTION:600dpi
NUMBER OF LINES:600/6=
100 LINES PER INCH

DITHER MATRIX

4 PIXELS

RESOLUTION:600dpi
NUMBER OF LINES:600/4=
150 LINES PER INCH

IMAGE PROCESSING APPARATUS THAT SETS A SPATIAL FREQUENCY OF A CHROMATIC FOREGROUND IMAGE OF A WATERMARK TO BE LOWER THAN A SPATIAL FREQUENCY OF AN ACHROMATIC FOREGROUND IMAGE OF A COMPARABLE WATERMARK, ASSOCIATED IMAGE FORMING APPARATUS, IMAGE PROCESSING METHOD AND RECORDING MEDIUM

CROSS-REFERENCE TO RELATED APPLICATIONS

This Nonprovisional application claims priority under 35 U.S.C. §119(a) on Patent Application No. 2010-267242 filed in Japan on Nov. 30, 2010, the entire contents of which are hereby incorporated by reference.

BACKGROUND

1. Technical Field

The present invention is intended to provide an image processing apparatus, an image forming apparatus, an image processing method, a computer program and a recording medium, in which a pattern associated with a chromatic watermark or an achromatic watermark for copy control, which appears as a result of making a copy, is allowed to be generated depending on each color in the case of generating watermark data associated with the watermark.

2. Description of Related Art

Certified copies (e.g., family registers and certificates of residence) published by official agencies on the basis of original documents containing personal information are widely used as papers for authenticating individuals. In order to ensure the function as papers for authenticating individuals, certified copies are required to be distinguished clearly from duplications thereof. Moreover, certified copies published by official agencies require measures to protect privacy, since personal information is contained therein.

Documents printed on the basis of original documents in companies also require measures to protect privacy as well as the certified copies described above, since personal information such as customer information is sometimes contained therein. Moreover, when commercial or technical confidential information is contained in documents created in companies, it is necessary to prevent leakage of the documents to a third party who is under no obligation to keep secrets.

Japanese Patent Application Laid-Open No. 2007-88763 discloses a print control unit for causing a computer to join contents data (original image data) indicative of information contained in an original document with watermark data indicative of a watermark for copy control (e.g., a text or a mark for warning such as "COPY", "COPY PROHIBITED" or "CONFIDENTIAL"), which is invisible in a certified copy or a document but appears in the duplication of a certified copy or a document made by a copying machine, and printing a certified copy or a document on the basis of obtained composite data. The print control unit can cause a computer to join original image data with watermark data and print an image associated with the watermark data and the original image data on normal paper, eliminating the need to use anti-copying and anti-counterfeiting paper having a watermark printed thereon in advance. Moreover, the user is allowed to select easily a watermark appropriate for the information contained in a certified copy or a document.

In recent years, an image forming apparatus for causing an image reading unit to read an original document printed on paper to generate original image data and joining the generated original image data with watermark data to form an image showing a certified copy or a document has also been proposed in view of a case where the original document is not digitized. An image forming apparatus enables formation of a chromatic (color) image showing a certified copy or a document and advance specification of a chromatic color to be used for a watermark for copy control.

SUMMARY

An image is generally formed from a dot pattern. In broad terms, a dot pattern (a halftone pattern) in a watermark for copy control is composed of: a part (which will be hereinafter referred to as a foreground) that indicates a text or a mark for warning and appears; and a part (which will be hereinafter referred to as a background) that does not appear.

In order to make clear distinction between an original document and the duplication thereof, a foreground of a watermark is required not to appear in an original document and to appear in the duplication. An achromatic watermark is formed using a black color material, which has lower lightness than a chromatic color material. Accordingly, the lightness contrast of an achromatic watermark with a page background (the color of paper) is higher than that of a chromatic watermark. For example, when some failure occurs in output equipment and a color material is not outputted for a pixel where the color material is normally to be outputted, it becomes easier to recognize a foreground in an original document. On the other hand, the lightness contrast of a chromatic watermark is lower than that of an achromatic watermark. Accordingly, it remains difficult to recognize a foreground in an original document even when the same degree of failure occurs in output equipment and a color material is not outputted for a pixel.

In image processing in the process of making a copy, the clarity of a black text is valued and an edge enhancement process is performed for a black text with a higher degree than for a chromatic image. A black text part is also substituted aggressively by black in black generation and under color removal processing. That is, an achromatic foreground in the duplication, which is recognized as a black text and undergoes the edge enhancement process mentioned above, appears and it becomes easier to recognize the foreground. In contrast, even when a chromatic foreground undergoes an edge enhancement process, the process has a smaller effect on a chromatic foreground than on an achromatic foreground and therefore some chromatic foregrounds do not readily appear. This makes a difference in image quality between the duplication of an achromatic foreground and the duplication of a chromatic foreground. The image forming apparatus described above, which forms a similar dot pattern for a chromatic watermark and for an achromatic watermark, has a problem of the difference in quality, since a foreground of an achromatic watermark in an original document becomes noticeable or it becomes more difficult to recognize a chromatic foreground in the duplication.

The present invention has been devised in view of such a situation, and an object thereof is to provide an image processing apparatus, an image forming apparatus, an image processing method, a computer program and a recording medium, in which an image pattern to form a watermark is changed depending on a color to be used, so that it becomes difficult to recognize a foreground in an original document, a foreground in the duplication is recognized clearly, and a difference in quality between a foreground in chromatic duplication and a foreground in an achromatic duplication is allowed to be reduced.

Means For Solving The Problems

An image processing apparatus according to the present invention is characterized by comprising: a generating section for generating watermark data which denote a chromatic watermark and an achromatic watermark for copy control, which appear as a result of making a copy; and a composition section for generating composite image data which denote an image composed by joining an original image with a watermark, on a basis of the watermark data generated by the generating section and original image data obtained by reading an original document, wherein the generating section includes: a chromatic pattern generating section for generating a chromatic image pattern to form a chromatic watermark; and an achromatic pattern generating section for generating an achromatic image pattern to form an achromatic watermark, wherein the generating section generates watermark data on a basis of the chromatic image pattern generated by the chromatic pattern generating section or the achromatic image pattern generated by the achromatic pattern generating section, wherein the chromatic image pattern includes a first chromatic image pattern, which appears as a result of making a copy, wherein the achromatic image pattern includes a first achromatic image pattern, which appears as a result of making a copy, wherein a spatial frequency of the first chromatic image pattern is lower than a spatial frequency of the first achromatic image pattern.

An image processing apparatus according to the present invention is characterized in that the chromatic image pattern further includes a second chromatic image pattern, which does not appear as a result of making a copy, wherein the achromatic image pattern further includes a second achromatic image pattern, which does not appear as a result of making a copy, wherein the first chromatic image pattern, which appears as a result of making a copy, is stored in association with the second chromatic image pattern which does not appear as a result of making a copy, wherein the first achromatic image pattern, which appears as a result of making a copy, is stored in association with the second achromatic image pattern, which does not appear as a result of making a copy.

An image forming apparatus according to the present invention is characterized by comprising: an image processing apparatus; and an image forming section for forming an image on a sheet on a basis of the original image data and the watermark data, which are processed by the image processing apparatus.

An image processing method according to the present invention is characterized by comprising steps of generating watermark data which denote a chromatic watermark and an achromatic watermark for copy control, which appear as a result of making a copy; generating composite image data which denote an image composed by joining an original image with a watermark, on a basis of the generated watermark data and original image data obtained by reading an original document; generating a chromatic image pattern to form a chromatic watermark; generating an achromatic image pattern to form an achromatic watermark; and generating watermark data on a basis of the generated chromatic image pattern or the generated achromatic image pattern, wherein the chromatic image pattern includes a first chromatic image pattern, which appears as a result of making a copy, wherein the achromatic image pattern includes a first achromatic image pattern, which appears as a result of making a copy, wherein a spatial frequency of the first chromatic image pattern is lower than a spatial frequency of the first achromatic image pattern.

A computer-readable recording medium according to the present invention is characterized by the computer program comprising steps of causing a computer to generate watermark data which denote a chromatic watermark and an achromatic watermark for copy control, which appear as a result of making a copy; causing a computer to generate composite image data which denote an image composed by joining an original image with a watermark, on a basis of the generated watermark data and original image data obtained by reading an original document; causing a computer to generate a chromatic image pattern to form a chromatic watermark; causing a computer to generate an achromatic image pattern to form an achromatic watermark; and causing a computer to generate watermark data on a basis of the generated chromatic image pattern or the generated achromatic image pattern, wherein the chromatic image pattern includes a first chromatic image pattern, which appears as a result of making a copy, wherein the achromatic image pattern includes a first achromatic image pattern, which appears as a result of making a copy, wherein a spatial frequency of the first chromatic image pattern is lower than a spatial frequency of the first achromatic image pattern.

In the present invention, the spatial frequency (e.g. the number of lines per unit length when using dithering for halftone, or the number of dots per unit length) of a chromatic image pattern, which appears as a result of making a copy, in a watermark is set lower than the spatial frequency of an achromatic image pattern, which appears as a result of making a copy. By virtue of this, it becomes more difficult to recognize a foreground in an original document when the foreground is generated using an achromatic color. On the other hand, a foreground in the duplication is recognized clearly when the foreground is generated using a chromatic color. Moreover, a difference in quality between a foreground in a chromatic duplication and a foreground in an achromatic duplication is reduced. On the other hand, a background, which is not recognized or hardly recognized in the duplication, is generated using the same image pattern regardless of a color to be used.

In the present invention, an image pattern, which appears as a result of making a copy, and an image pattern, which does not appear as a result of making a copy, are stored in association with each other for each of a chromatic watermark and an achromatic watermark. This makes it difficult to recognize an image pattern, which appears as a result of making a copy, in an original document.

The above and further objects and features will more fully be apparent from the following detailed description with accompanying drawings.

DETAILED DESCRIPTION (Embodiment 1)

Figure 1:
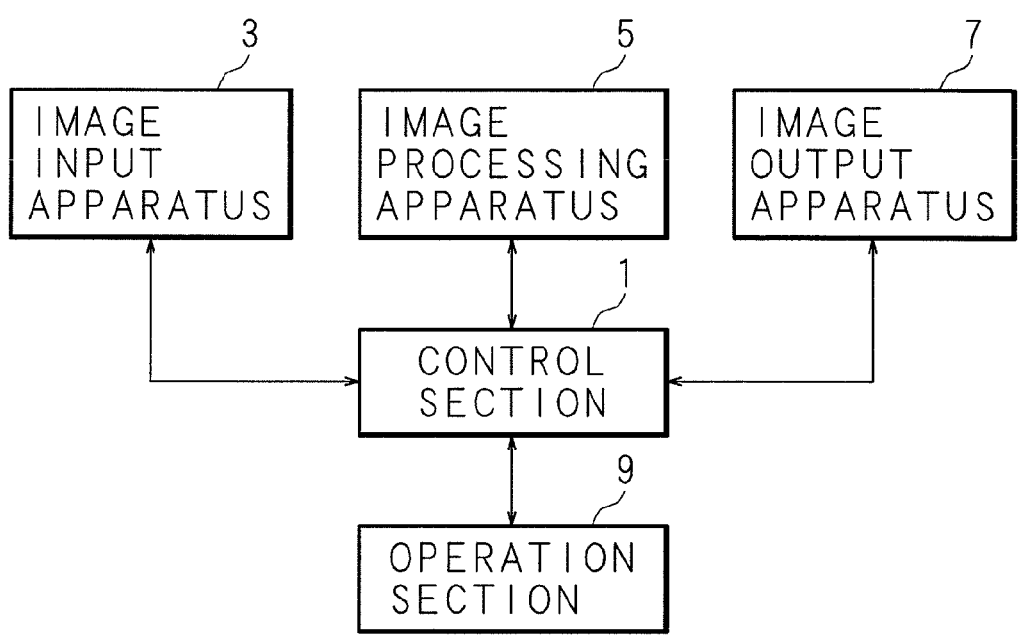
FIG. 1 is a block diagram for explaining the internal configuration of an image forming apparatus according to Embodiment 1.
Figure 2:
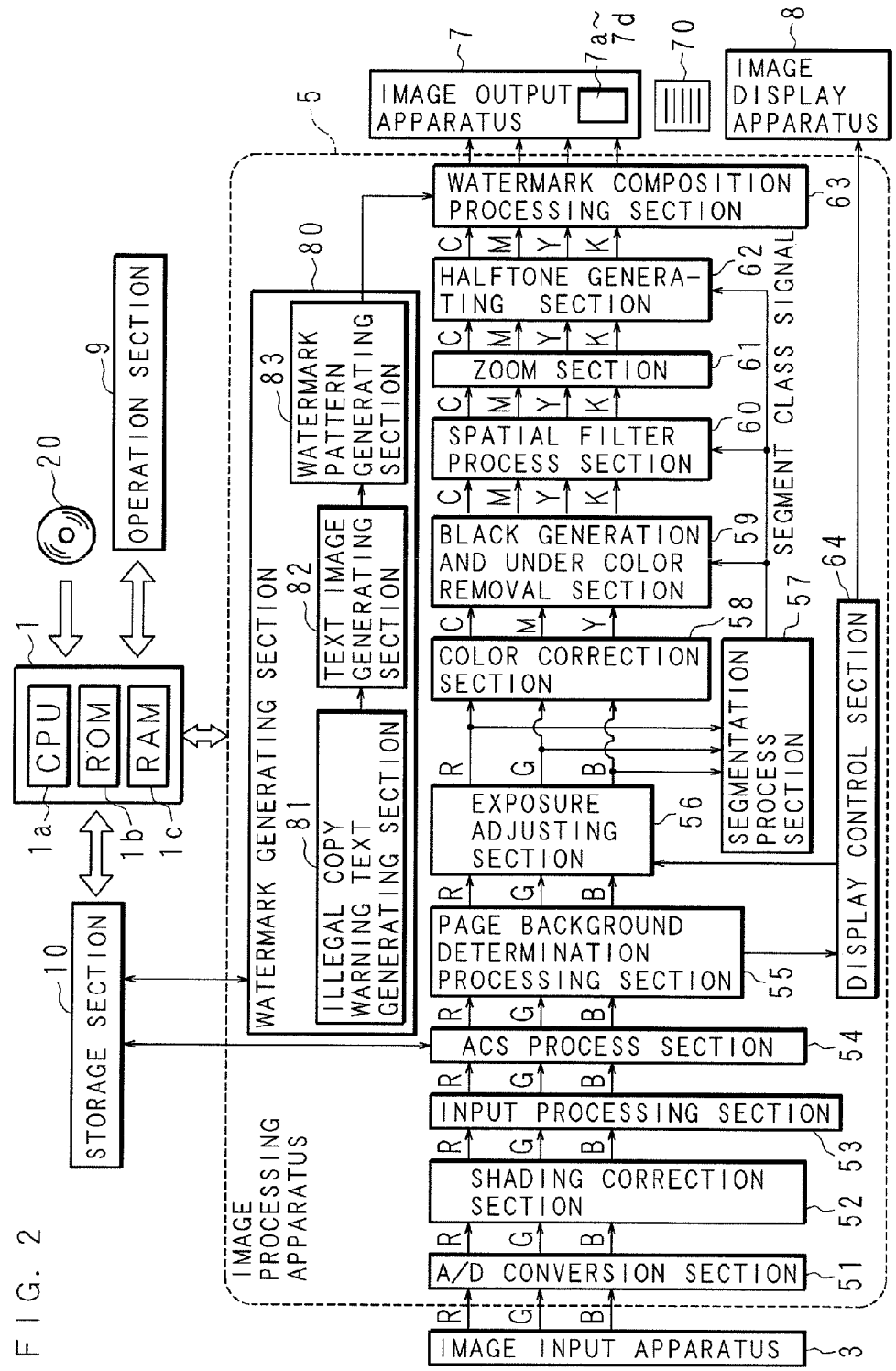
FIG. 2 is a block diagram for explaining the configuration of an image processing apparatus.

The Following Description Will Explain the Present Invention in detail with reference to the drawings illustrating an image forming apparatus according to Embodiment 1. FIG. 1 is a block diagram for explaining the internal configuration of an image forming apparatus, and FIG. 2 is a block diagram for explaining the configuration of an image processing apparatus.

The image forming apparatus is provided with a control section 1, an image input apparatus 3, an image processing apparatus 5, an image output apparatus 7 and an operation section 9. The control section 1 is a microcomputer, which is provided with: a ROM (Read Only Memory) 1b storing a control program for controlling the respective hardware parts; a CPU (Central Processing Unit) 1a for executing the control program; a RAM (Random Access Memory) 1c for storing various kinds of data to be generated during execution of the control program; and the like.

The image input apparatus 3 is means for reading an image of an original. The image input apparatus 3 is provided with: a light source for irradiating an original document to be read with light; an image sensor having a CCD (Charge Coupled Device); and the like. In the image input apparatus 3, an image of reflected light from an original document, which is put on a predetermined reading station, is focused on the image sensor and an analog RGB (R: Red, G: Green, B: Blue) electric signal is outputted. The analog electric signal outputted from the image input apparatus 3 is inputted to the image processing apparatus 5.

The image processing apparatus 5 converts the analog electric signal outputted from the image input apparatus 3 into a digital electric signal and then performs image processing depending on the type of an original document so as to generate an image signal to be outputted. The generated image signal is outputted to the image output apparatus 7. The image output apparatus 7 is provided with developing unit storing respective developer 7a-7d of cyan, magenta, yellow and black. The image processing apparatus 5 generates a CMYK signal (C: Cyan, M: Magenta, Y: Yellow, K: Black) as an image signal to be outputted. The internal configuration, the operation and the like of the image processing apparatus 5 will be described later in detail.

The image output apparatus 7 is means for forming an image on a sheet 70, such as paper or an OHP film, on the basis of the image signal outputted from the image processing apparatus 5. Accordingly, the image output apparatus 7 is provided with charging unit, a laser scanning unit, the developing unit, transferring unit and the like (not illustrated in the drawings). The charging unit electrically charges a photoreceptor at a predetermined potential. The laser scanning unit produces laser light in response to image data accepted from the image processing apparatus so as to generate an electrostatic latent image on the photoreceptor. The developing unit supplies developer 7a-7d (toner) to the electrostatic latent image formed on the surface of the photoreceptor so as to visualize the image. The transferring unit transfers a toner image formed on the surface of the photoreceptor onto paper. The image output apparatus 7 forms an image desired by the user on paper by electrophotography. Here, image formation may be achieved by inkjet printing, thermal transfer printing, dye sublimation printing or the like, in place of the electrophotography using a laser scanning unit.

The operation section 9 is provided with various kinds of switches and buttons for accepting instructions, selection operations or the like by the user.

As illustrated in FIG. 2, the image processing apparatus 5 is provided with an A/D conversion section 51, a shading correction section 52, an input processing section 53, an ACS (Automatic Color Selection) process section 54, a page background determination processing section 55, an exposure adjusting section 56, a segmentation process section 57, a color correction section 58, a black generation and under color removal section 59, a spatial filter process section 60, a zoom section 61, a halftone generating section 62, a watermark composition processing section 63 and a watermark generating section 80.

The A/D conversion section 51 converts an analog RGB signal inputted from the image input apparatus 3 into a digital signal. The shading correction section 52 performs the processing of removing various kinds of distortion to be generated in an illuminating system, an image focusing system or an image sensing system of the image input apparatus 3, on the digital RGB signal outputted from the A/D conversion section 51. The shading correction section 52 also adjusts the color balance. The input processing section 53 performs image adjustment processing such as gamma correction and contrast control.

The ACS process section 54 determines whether a read-out original image(document) is a chromatic (color) image or an achromatic (monochrome) image, using the RGB signal outputted from the input processing section 53. For example, the ACS process section 54 determines whether a pixel is a chromatic pixel or an achromatic pixel, for each pixel. When a plurality of chromatic pixels the number of which is equal to or larger than a predetermined number are detected in series in a given pixel order, the ACS process section 54 recognizes the plurality of chromatic pixels as a chromatic block. Furthermore, when the number of chromatic blocks existing in one line is equal to or larger than a predetermined number, the ACS process section 54 counts the line as a chromatic line. When the number of chromatic lines existing in an original image is equal to or larger than a predetermined number, the ACS process section 54 determines that the image of the original is a chromatic image. When the number of chromatic lines existing in an original image is smaller than the predetermined number, the ACS process section 54 determines that the image of the original is an achromatic image. Here, the number of pixels which is used as the criterion for recognizing a chromatic block, the number of chromatic blocks which is used as the criterion for recognizing a chromatic line, and the number of chromatic lines which is used as the criterion for determining that an image of an original is a chromatic image may be set arbitrarily.

The following method is an example of a method of distinguishing for each pixel whether the pixel is a chromatic pixel or an achromatic pixel.

(1) The difference between the maximum value and the minimum value of an RGB signal is compared with a threshold THa as expressed by the following expression. Here, the maximum value of an RGB signal is denoted by max(R, G, B), and the minimum value of an RGB signal is denoted by min(R, G, B) in the following expression.

$$\max(R,G,B) - \min(R,G,B) > THa \text{ (e.g., 20)}$$

It is determined that a pixel is a chromatic pixel when the difference between the maximum vale and the minimum value of an RGB signal exceeds THa.

(2) The absolute value of the difference of each color component of an RGB signal is calculated and compared with a threshold.

The following method may be employed as a determination method at the ACS process section 54. First, the difference between the maximum value and the minimum value of an RGB signal is compared with a threshold THa (e.g., 20), and whether a pixel is a chromatic pixel or not is determined. Then, the number of pixels in the entire original image, which are determined respectively to be a chromatic pixel, is counted. For example, when 7000 or more chromatic pixels exist in an original image, it is determined that the original document is a color (chromatic) original document. When chromatic pixels less than 7000 exist in an original image, it is determined that the original document is a monochrome (achromatic) original document.

Here, used as the threshold THa is not the proportion of the number of chromatic pixels to the number of pixels in the entire original image but an absolute number, since this allows to judge an original document, which is partly colored (e.g., an original stamped with a seal) and has a size (e.g., A3) larger than a normal size (e.g., A4), as a chromatic original document.

A method of calculating the absolute value of the difference of each color component of an RGB signal and comparing the absolute value with a threshold or any other known determination method may be used as a determination method of a chromatic color or an achromatic color. That is, a determination method of a chromatic color or an achromatic color is not limited to the method illustrated above but may be any other method that enables accurate determination of a chromatic color or an achromatic color. Moreover, a method of determining whether a read-out original document is a chromatic (color) original document or an achromatic (monochrome) original document is not limited to the above method but may be implemented with any other known technique disclosed in a patent application.

The image forming apparatus is also provided with a storage section 10 having an HDD (Hard Disk Drive), a flash memory or the like. Data (a determination result) outputted from the ACS process section 54 is stored in the storage section 10. Here, the storage section 10 may be provided in the image processing apparatus 5.

The page background determination processing section 55 determines whether the page background density exceeds a predetermined threshold or not. Specifically, the page background determination processing section 55 applies an inputted RGB signal to the following expression so as to convert the RGB signal into a luminance signal.

$$Yj = 0.30Rj + 0.59Gj + 0.11Bj$$

Here, the luminance signal of each pixel is denoted by Yj, and color component signals of each pixel are denoted by Rj, Gj and Bj.

The page background determination processing section 55 may calculate a lightness signal in place of a luminance signal. For example, a lightness signal may be calculated by conversion into an L*a*b* signal, or a uniform color space in other words, defined by CIE (Commission International de l'Eclairage).

Figure 3:
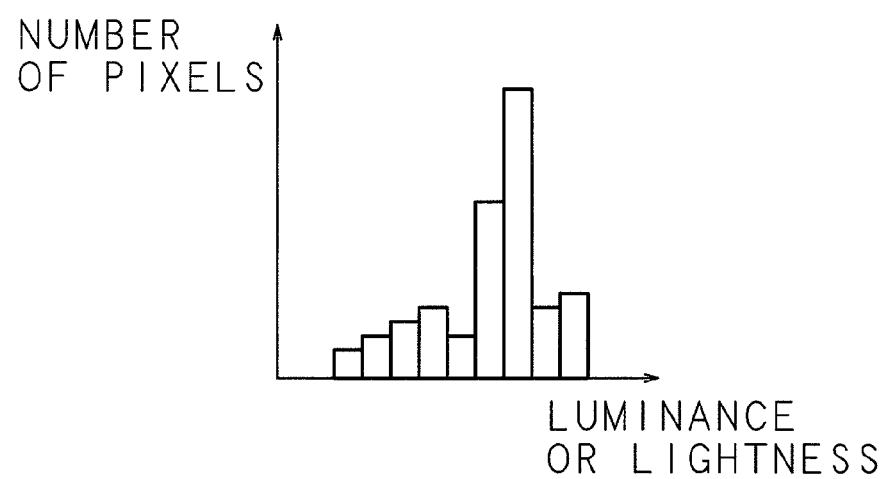
FIG. 3 is an example of a histogram showing the relation between the number of pixels and the luminance or lightness.

FIG. 3 is an example of a histogram showing the relation between the number of pixels and the luminance or lightness. As illustrated in FIG. 3, the page background determination processing section 55 creates a histogram for the entire image on the basis of the luminance signal or lightness signal described above. The page background determination processing section 55 treats luminance (or lightness), which corresponds to the largest number of pixels (the frequency, the number of times) equal to or larger than a threshold th1 (the minimum value of the number of pixels, which are determined to be of page background. For example, the original size is stored in a memory in relation to the minimum value of the number of pixels determined to be of a page background, and a threshold is set depending on the detection result of the original size), as the luminance of a page background part in a created histogram and compares the luminance Yf with a preset threshold th2.

When Yf>th2 is satisfied, the page background determination processing section 55 determines that the luminance of the page background is higher than a threshold (a page background exists). When Yf>th2 is not satisfied, the page background determination processing section 55 determines that the luminance of the page background is equal to or lower than a threshold (a page background does not exist). Here, values which enable appropriate determination of a page background depending on the original document are set as the thresholds th1 and th2.

As illustrated in FIG. 2, the image processing apparatus 5 is also provided with a display control section 64 for controlling the drive of an image display apparatus 8. The display control section 64 is provided with a CPU, a ROM, a RAM and the like. The image processing apparatus 5 gives an instruction from the display control section 64 to the image display apparatus 8 to display a warning for prompting the user to adjust the exposure, when addition of a watermark for copy control to an original image is set and it is determined by the page background determination processing section 55 that the luminance exceeds a threshold.

Figure 4:
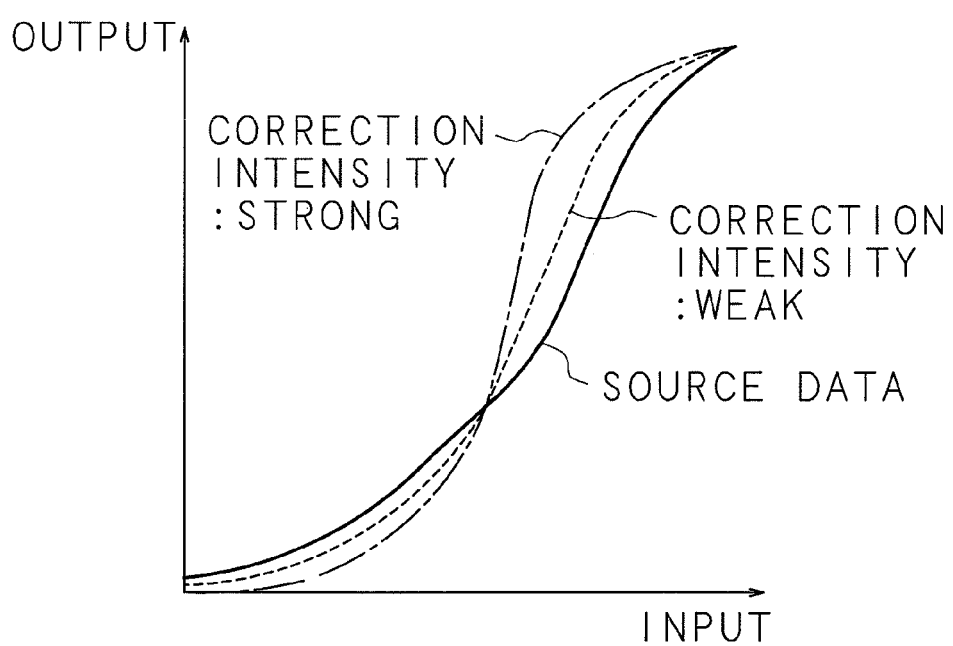
FIG. 4 is a diagram illustrating an example of an LUT for exposure correction.

FIG. 4 is a diagram illustrating an example of an LUT (Look Up Table) for exposure correction. When an instruction of adjusting exposure is inputted from the operation section 9, the exposure adjusting section 56 switches from one of a plurality of LUTs (see FIG. 4) preset in the storage section 10 to another so as to correct an RGB value of an input image and performs the processing of removing page background. The exposure adjusting section 56 then outputs data to the segmentation process section 57 and the color correction section 58. Here, when an instruction of adjusting exposure is not inputted from the operation section 9, the exposure adjusting section 56 outputs data to the segmentation process section 57 and the color correction section 58 without executing the processing of removing page background.

Using an RGB signal, the segmentation process section 57 performs the processing of segmenting each pixel in an input image into any one region among a black text region, a color text region, a halftone dot region, a photograph region and the like. On the basis of the segmentation result, the segmentation process section 57 outputs a segmentation class signal indicating which region a pixel belongs to, to the black generation and under color removal section 59, the spatial filter process section 60 and the halftone generating section 62 of the following stage.

The color correction section 58 generates a CMY signal (C: Cyan, M: Magenta, Y: Yellow) which is complementary colors of an RGB signal and performs the processing of removing color impurity caused by the spectral characteristics of CMY color materials including unnecessary absorption components in order to improve the color reproducibility.

The black generation and under color removal section 59 performs black generation for generating a black (K) signal from a three color CMY signal obtained by color correction and performs the processing of generating a new CMY signal by subtracting the K signal obtained by black generation from the original CMY signal. By such processing, a three color CMY signal is converted into a four CMYK chrominance signal.

An example of black generation processing is a method (a common method) of black generation using skeleton black. In the method, the black generation and under color removal processing is expressed by the following expression, wherein the input/output characteristics of the skeleton curve is denoted by y=f(x), inputted data are denoted by C, M and Y, outputted data are denoted by C', M', Y' and K', and the UCR (Under Color Removal) rate is denoted by $\alpha(0<\alpha<1)$.

K'=f{min(C, M, Y)}
C'=C−αK'
M'=M−αK'
Y'=Y−αK'

The spatial filter process section 60 performs spatial filter processing using a digital filter, on image data of a CMYK signal inputted from the black generation and under color removal section 59 on the basis of a segmentation class signal, and corrects the spatial frequency characteristics so as to perform the processing of preventing blurring or graininess degradation of an output image.

In order to improve the reproducibility of a black text or a color text, for example, the spatial filter process section 60 performs an edge enhancement process in the spatial filter processing on a region segmented by the segmentation process section 57 into a black text or a color text, so that the enhancement of high frequency components of the region is carried out. At the same time, the halftone generating section 62 executes multi-level dithering processing on a screen having high resolution suitable for reproduction of high frequency components. Here, the halftone generating section 62 may be constructed to execute binarization processing.

The zoom section 61 executes the processing of enlargement or reduction of an image on data inputted from the spatial filter process section 60 on the basis of a zooming command (information indicative of a copy ratio of a printed image) inputted from the operation section 9. The halftone generating section 62 executes tone reproduction processing of outputting an image, on data inputted from the zoom section 61.

The watermark composition processing section 63 joins watermark pattern data (watermark data) inputted from the watermark generating section 80 with halftone data (original image data) inputted from the halftone generating section 62. Composition by joining the watermark pattern data with the halftone data is performed for any one color component data (plane) among C, M and K specified in advance. Composition is achieved by an OR operation, an AND operation or replacement processing for pixel values.

The watermark generating section 80 is provided with an illegal copy warning text generating section 81, a text image generating section 82 and a watermark pattern generating section 83. The illegal copy warning text generating section 81 generates illegal copy warning text data for warning such as "COPY", "COPY PROHIBITED" and "CONFIDENTIAL" on the basis of an instruction from the operation section 9. The text image generating section 82 converts the illegal copy warning text data into bitmap image data. The watermark pattern generating section 83 generates watermark pattern data including information indicative of small dots and information indicative of large dots corresponding to each plane, on the basis of the bitmap image data. Watermark pattern data is generated in accordance with a density value that is decided in view of the tendency to disappear of a background and the tendency to remain of a foreground in advance for each color, using a halftone process such as dithering or an error diffusion method. A watermark pattern may be formed from dots or may be formed from a line screen such as line screen halftone. The watermark pattern data generated by the watermark pattern generating section 83 is stored in the storage section 10.

Figure 5A:
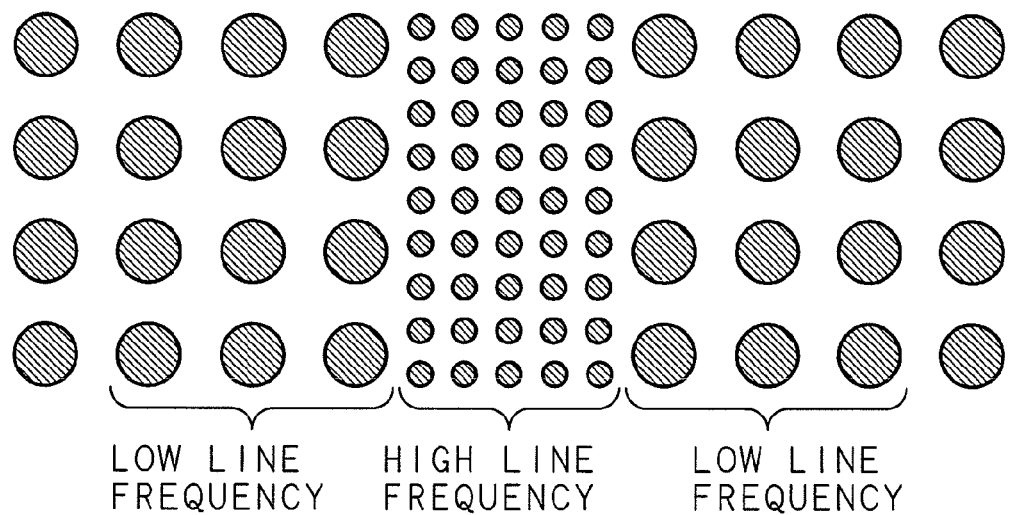
FIGS. 5A and 5B are explanatory diagrams for explaining the relation between the number of dots per unit length and the type of a watermark.
Figure 5B:
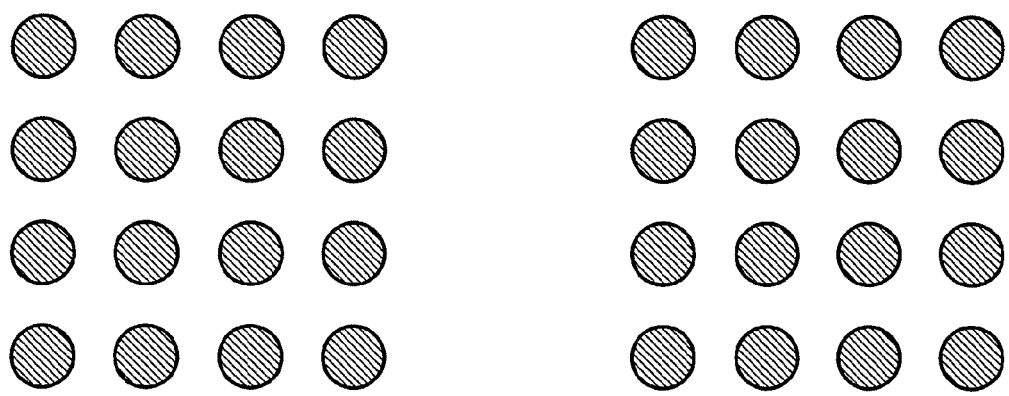

FIGS. 5A and 5B are explanatory diagrams for explaining the relation between the number of dots per unit length and the type of a watermark. In the image described in FIG. 5A, a large-diameter thin dot part (dispersed large dots part) including a small number of dots per unit length is arranged respectively on the left and on the right, and a small-diameter dense dot part (clustered small dots part) including a large number of dots per unit length is arranged therebetween. The density of dot rows (the number of lines per unit length or the spatial frequency) in the dispersed large dots part is lower than that of the clustered small dots part. The area occupied with dots per unit length is set at approximately the same area at the clustered small dots part and at the dispersed large dots part. Accordingly, the user recognizes both parts as substantially the same density and this makes it difficult for the user to recognize a watermark for copy control.

On the other hand, described in FIG. 5B is an image obtained by copying the watermark with a copying machine or a multi-function peripheral. A scanner (an image input apparatus) provided in a copying machine or a multi-function peripheral can recognize the dispersed large dots part (a low line frequency (low resolution) part) but cannot recognize the clustered small dots part (a high line frequency (high resolution) part) since the area of one dot in the clustered small dots part is small. Alternatively, a clustered small dots part is removed in the process of image processing. Accordingly, the clustered small dots part is not copied and does not readily appear in a copied image as illustrated in FIG. 5B. This makes it easy for the user to recognize a watermark for copy control.

Figure 6A:
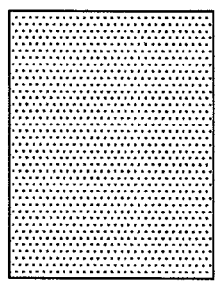
FIGS. 6A and 6B are explanatory diagrams for explaining generation of watermark pattern data, with which an illegal copy warning text do not readily appear in the duplication.
Figure 6A:
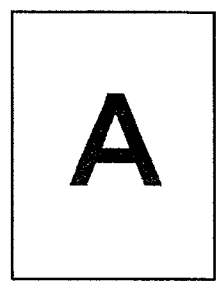
Figure 6A:
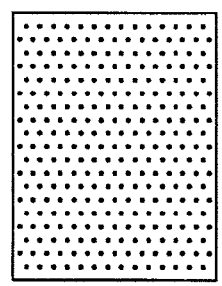
Figure 6A:
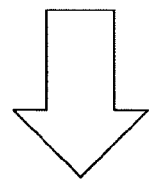
Figure 6B:
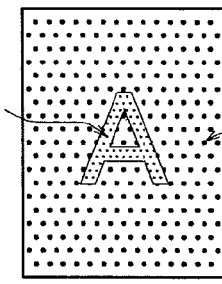

FIGS. 6A and 6B are explanatory diagrams for explaining generation of watermark pattern data, with which an illegal copy warning text do not readily appear in the duplication. As illustrated in FIG. 6A, the watermark pattern generating section 83 compares information indicative of clustered small dots, illegal copy warning text data, and information indicative of dispersed large dots with each other. The watermark pattern generating section 83 relates the information indicative of clustered small dots to an illegal copy warning text part in the illegal copy warning text data, and relates the information indicative of dispersed large dots to a non-illegal copy warning text part in the illegal copy warning text data. The watermark pattern generating section 83 then generates an illegal copy warning text part with clustered small dots and generates a non-illegal copy warning text part with dispersed large dots as illustrated in FIG. 6B. The illegal copy warning text part constitutes a background image, which does not readily appear as a result of making a copy, while the non-illegal copy warning text part constitutes a foreground image, which appears as a result of making a copy. Alternatively, when an illegal copy warning text appears, the watermark pattern generating section 83 relates the information indicative of dispersed large dots to an illegal copy warning text part and relates the information indicative of clustered small dots to a non-illegal copy warning text part. In such a case, the illegal copy warning text part constitutes a foreground image while the non-illegal copy warning text part constitutes a background image.

When specification of the type (a positive type in which an illegal copy warning text is printed and appears, or a negative type in which an illegal copy warning text is not printed and does not readily appear) of an illegal copy warning text, the color of a watermark and the like are inputted from the operation section 9, the watermark generating section 80 generates watermark pattern data associated with the specified color. When the ACS process section 54 determines that an original document is made up of a chromatic color in a state where the ACS function is in an enabled state and a chromatic color is specified as the color of a watermark in advance, the watermark generating section 80 generates watermark pattern data associated with the specified chromatic color. An example of a color to be specified in the present example is cyan, magenta and black to be used for electrophotography. Here, all colors which can be generated from red, green, blue and orange to be used for inkjet printing may also be specified. The watermark generating section 80 switches a watermark pattern of a foreground image, which appears as a result of making a copy, depending on a specified color.

Figure 7A:
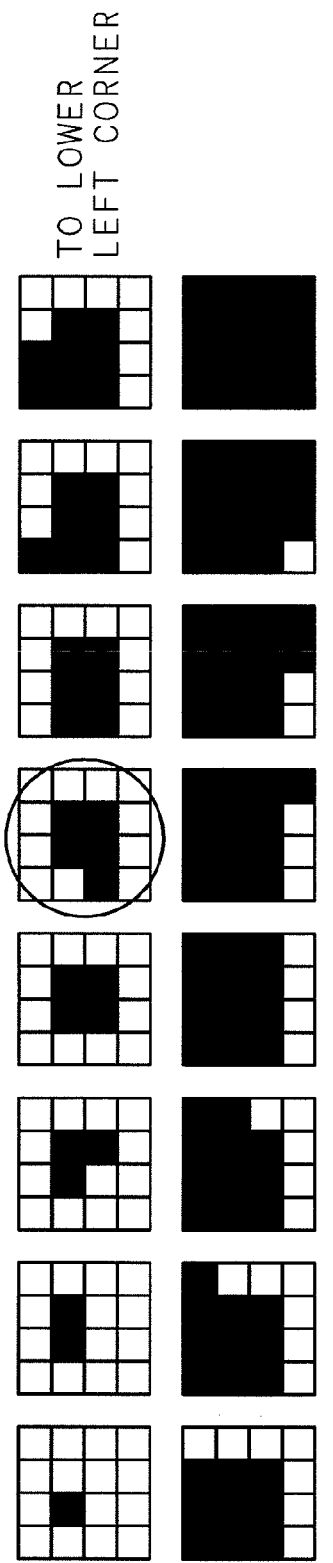
FIGS. 7A and 7B are explanatory diagrams for explaining an example of selection of a watermark pattern of a foreground image and a watermark pattern of a background image in the process of forming a watermark pattern of a foreground image and a background image using dithering for a halftone process.
Figure 7B:
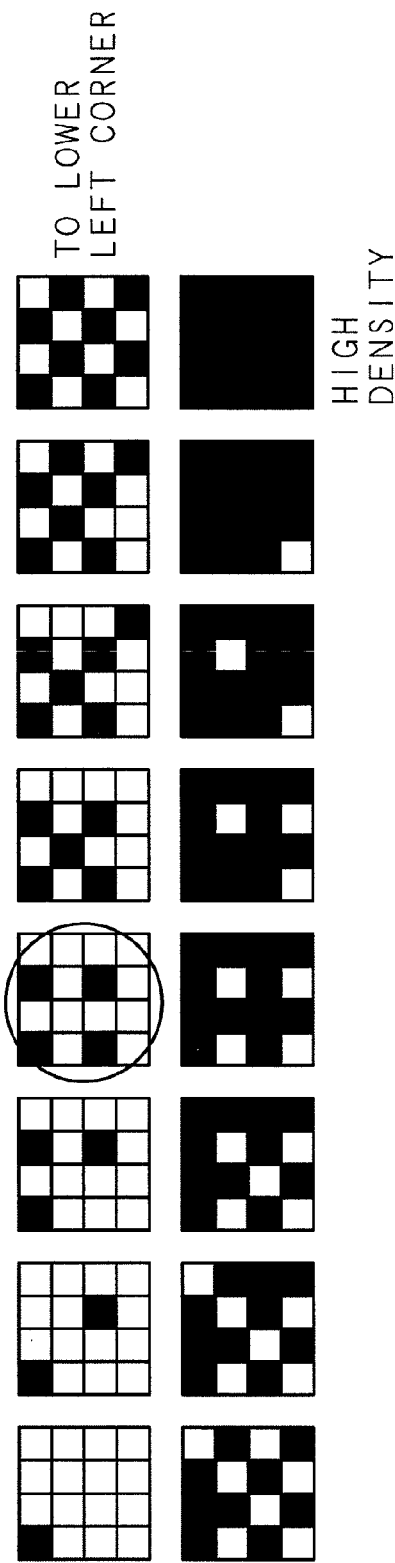

FIGS. 7A and 7B are explanatory diagrams for explaining an example of selection of a watermark pattern of a foreground image and a watermark pattern of a background image in the process of forming a watermark pattern of a foreground image and a background image using dithering for a halftone process. FIG. 7A illustrates an example of a pattern of a dither matrix to be used for a watermark pattern of a foreground image. FIG. 7B illustrates an example of a pattern of a dither matrix to be used for a watermark pattern of a background image. In FIGS. 7A and 7B, the density of a halftone pattern is lowest in the upper left corner and gets higher toward the right. Different halftone patterns are used as a watermark pattern of a foreground image and a watermark pattern of a background image. As illustrated in FIG. 7A, a watermark pattern of a foreground image is formed using a dither matrix of a dot clustered type, so that it becomes easy to recognize the watermark pattern as a result of making a copy. On the other hand, a watermark pattern of a background image is formed using a dither matrix of a dispersed dot type, in which dots grow in a dispersed manner, so that the watermark pattern becomes less noticeable (the tendency to disappear increases) as a result of making a copy.

FIGS. 7A and 7B illustrate an example, and the manner of growth of dots depending on the density, the watermark pattern of a foreground image and the watermark pattern of a background image are preset respectively. For example, a watermark pattern of a background image may be expressed using the error diffusion method without using a dither matrix as halftone. The density (density to be recognized) of a watermark pattern of a foreground image and that of a background image expressed by the same number of dots do not always accord with each other when a pattern of a dither matrix (a dither pattern) to be used for a watermark pattern of a foreground image is different from that of a background image. Moreover, since the density of a watermark pattern also varies according to the output characteristics of an image output apparatus, the density of each watermark pattern is obtained in advance by colorimetric technique and a pattern which gives substantially the same density is associated. For example, the associated watermark pattern to be used for a foreground image or a background image is stored in the storage section 10 or the like as a table. When the density of a watermark pattern can be specified (when the user is allowed to select a density using a control panel), a watermark pattern to be used for a foreground image or a background image is stored in the storage section 10 or the like as a table for each density, for example. The patterns circled in FIGS. 7A and 7B are used respectively as a watermark pattern of a foreground image and a watermark pattern of a background image. This makes it difficult to recognize a foreground image in an original document.

The all colors of black (K), cyan (C) and magenta (M) in a background image have relatively high screen ruling (e.g., approximately 100-200 LPI (Lines Per Inch)). Here, a background image is required not to be reproduced as a result of making a copy. Black (K), cyan (C) and magenta (M) may have screen ruling different from each other.

On the other hand, when one chromatic color, i.e., cyan (C) or magenta (M) is used, a foreground image has low screen ruling in comparison with a case where black (K) is used. For example, a foreground image is formed with 40 LPI when one chromatic color, i.e., cyan (C) or magenta (M) is used, while a foreground image is formed with 50 LPI when black (K) is used. That is, a spatial frequency associated with a chromatic foreground image is lower than a spatial frequency associated with an achromatic foreground image.

Figure 8B:
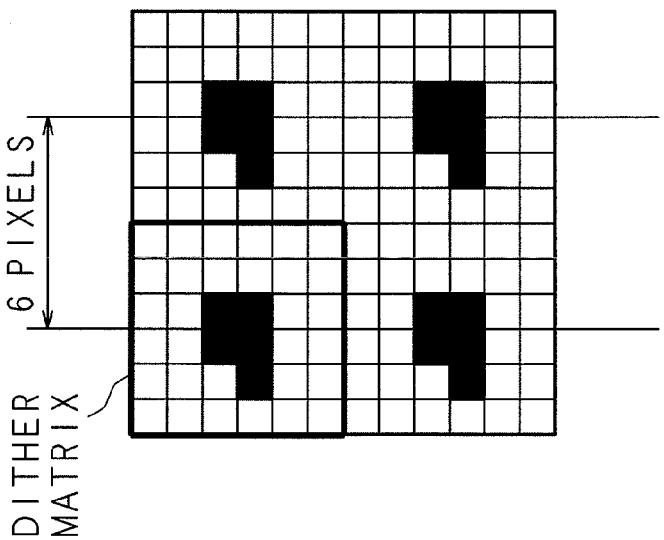
FIGS. 8A and 8B are explanatory diagrams for explaining an example of the relation between a change of screen ruling and a dither matrix in a foreground image.
Figure 8A:
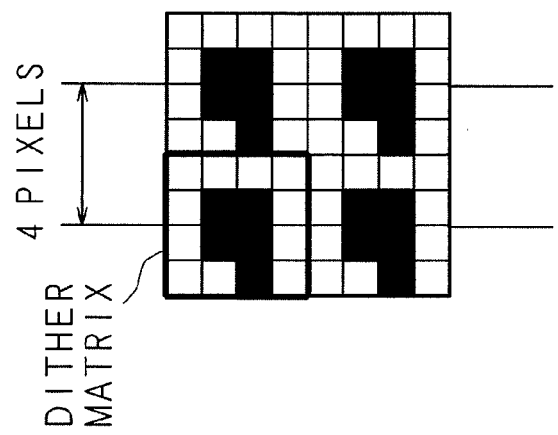

FIGS. 8A and 8B are explanatory diagrams for explaining an example of the relation between a change of screen ruling and a dither matrix in a foreground image. FIG. 8A illustrates an example of a pattern of a dither matrix having high screen ruling. FIG. 8B illustrates an example of a pattern of a dither matrix having low screen ruling. As illustrated in FIG. 8A, a dither matrix which is 4×4 pixels, for example, is used as an achromatic watermark pattern, for which a pattern having high screen ruling is to be used. On the other hand, as illustrated in FIG. 8B, a dither matrix which is 6×6 pixels, for example, is used as a chromatic watermark pattern, for which a pattern having low screen ruling is to be used. When a dither matrix having low screen ruling and a dither matrix having high screen ruling have the same pattern, the dither matrix having lower screen ruling has a lower density. Accordingly, a pattern having a different dither matrix illustrated in the lower right corner of FIG. 8B (a pattern in which the ratio of pixels where a color material is to be outputted is high) is used in order to realize an equivalent density.

A foreground image which is black has high screen ruling in comparison with a case where one chromatic color, i.e., cyan or magenta is used, and the screen ruling near to the screen ruling of a background image can make it difficult to recognize a foreground in an original document. On the other hand, in a foreground image which is cyan or magenta, a foreground in the duplication clearly appears and it becomes possible to cause the user to recognize the foreground, in comparison with a case where an image is made up of black screen ruling. Moreover, a difference in quality between a foreground which is cyan or magenta and a foreground which is black in the duplication is reduced, and a foreground appears with a substantially certain level of quality regardless of a specified color.

Figure 9:
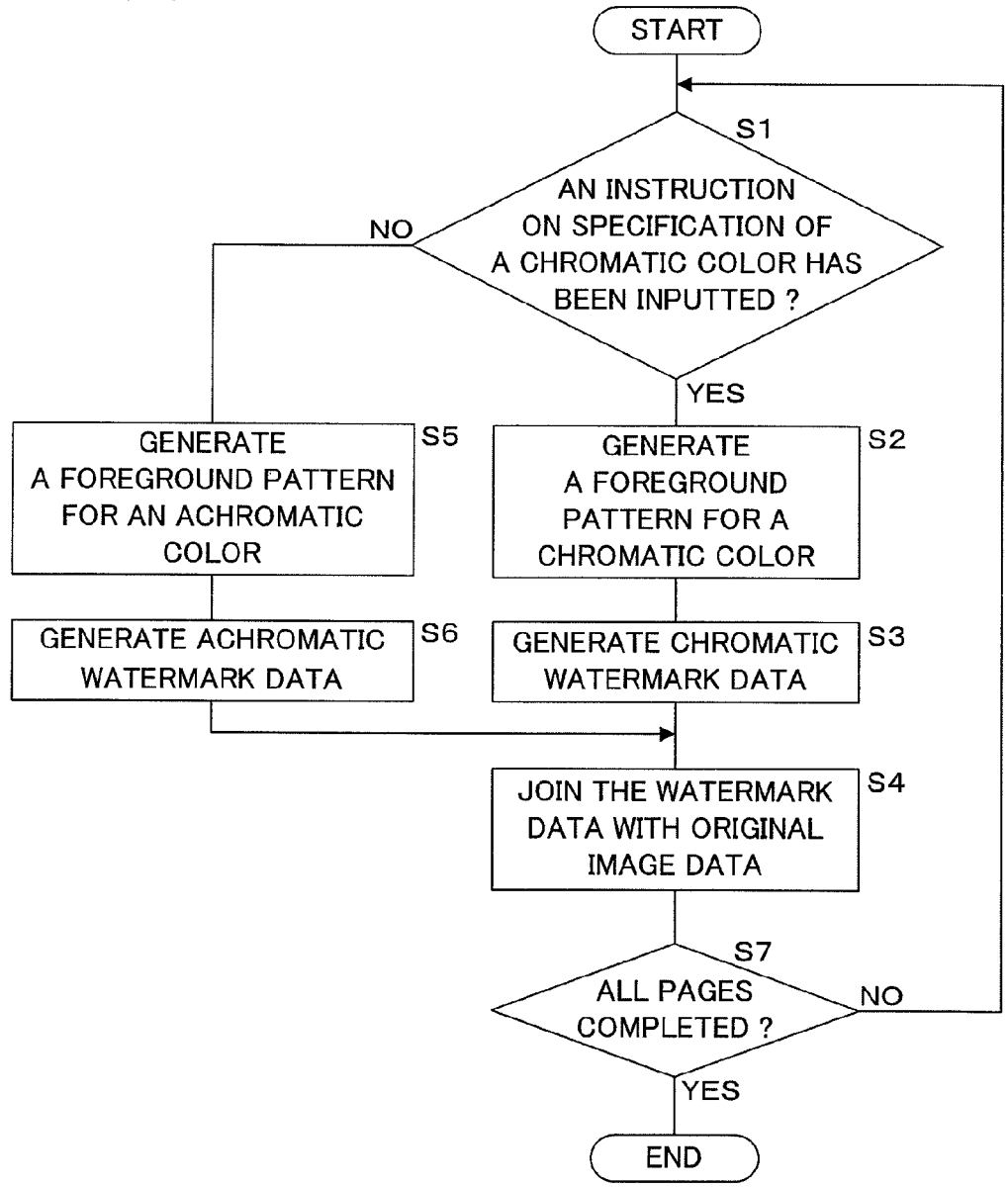
FIG. 9 is a flowchart for explaining the composition processing of joining an original image with a watermark depending on a chromatic color or an achromatic color.

FIG. 9 is a flowchart for explaining the composition processing of joining an original image with a watermark depending on a chromatic color or an achromatic color. Here, it is to be assumed that the control section 1 stores the total number of pages of inputted original image data in advance in the storage section 10 when a plurality of original image data is inputted. It is also to be assumed that the composition processing is executed for each page.

The control section 1 determines whether an instruction on specification of cyan or magenta (a chromatic color) as the color of a watermark to be added to an original image has been inputted from the operation section 9 or not (step S1). When an instruction on specification of a chromatic color has been inputted (step S1: YES), the control section 1 causes the watermark generating section 80 to generate a foreground pattern for a chromatic color, which appears as a result of making a copy (step S2). For example, a pattern associated with a foreground image having a dot pattern with 40 LPI is generated.

The control section 1 then causes the watermark generating section 80 to generate a background pattern associated with a background image stored in association with a pattern associated with the above foreground image, to join the background pattern with the foreground pattern and to generate chromatic watermark data (step S3). Next, the control section 1 causes the watermark composition processing section 63 to join the watermark data generated by the watermark generating section 80 with halftone data (original image data) generated by the halftone generating section 62 (step S4).

When an instruction on specification of a chromatic color has not been inputted (step S1: NO), the control section 1 causes the watermark generating section 80 to generate a foreground pattern for an achromatic color, which appears as a result of making a copy (step S5). For example, a pattern associated with a foreground image having a dot pattern with 50 LPI is generated. The control section 1 then causes the watermark generating section 80 to generate a background pattern associated with a background image stored in association with a pattern associated with the above foreground image, to join the background pattern with the foreground pattern and to generate achromatic watermark data (step S6), and advances the process to the step S4.

When composition by joining original image data with watermark data is achieved, the control section 1 counts one page and determines whether the cumulative number of pages is equal to or larger than the total number of pages stored in the storage section 10 or not. That is, whether composition by joining original image data with watermark data for all pages has been achieved or not is determined (step S7). When the cumulative number of pages is smaller than the total number of pages stored in the storage section 10, that is, when composition by joining original image data with watermark data for all pages has not been achieved (step S7: NO), the control section 1 returns the process to the step S1. When the cumulative number of pages is equal to or larger than the total number of pages stored in the storage section 10, that is, when composition by joining original image data with watermark data for all pages has been achieved (step S7: YES), the control section 1 terminates the composition processing.

Though the control section 1 in the above embodiment causes the watermark generating section 80 to generate a foreground pattern for a chromatic color or an achromatic color in response to an instruction (steps S2 and S5), the control section 1 may cause the watermark generating section 80 to generate a foreground pattern for a chromatic color and a foreground pattern for an achromatic color, store the foreground patterns in advance in the storage section 10, read a foreground pattern for a chromatic color or an achromatic color from the storage section 10 in the step S3 or S6, and join the read foreground pattern with a background pattern.

Figure 10:
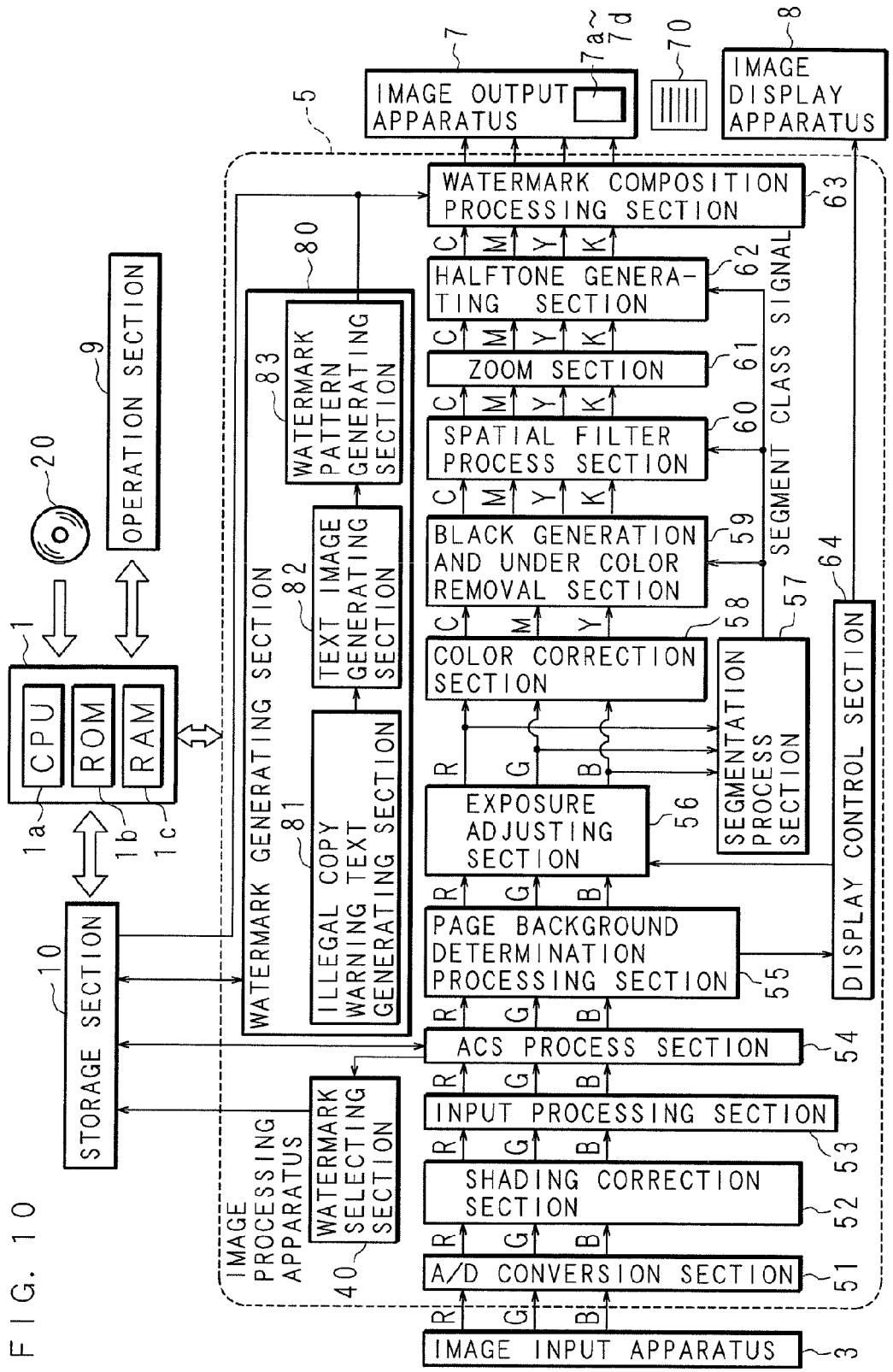
FIG. 10 is a block diagram for explaining the configuration of an image processing apparatus according to a variation example.

Moreover, the present invention may employ the following structure. FIG. 10 is a block diagram for explaining the configuration of an image processing apparatus according to a variation example. The image processing apparatus 5 is provided with a watermark selecting section 40, causes the watermark generating section 80 to generate chromatic watermark data and achromatic watermark data, and stores the generated watermark data in the storage section 10.

The watermark selecting section 40 selects watermark pattern data to be used, or watermark data in other words, depending on the determination result at the ACS process section 54. When the determination result at the ACS process section 54 indicates an achromatic color, the watermark selecting section 40 outputs achromatic watermark data stored in the storage section 10 to the watermark composition processing section 63. On the other hand, when the determination result at the ACS process section 54 indicates a chromatic color, the watermark selecting section 40 outputs chromatic watermark data, which is stored in the storage section 10 and specified by the user, to the watermark composition processing section 63.

Here, watermark data may be outputted from the storage section 10 to the watermark composition processing section 63 without passing through the watermark selecting section 40, when a chromatic color is specified by the user as the color of a watermark or when the ACS function is in a disabled state.

Moreover, an image forming apparatus may have the following structure. When specification of the color of a watermark is inputted from the operation section 9, the image forming apparatus stores watermark data associated respectively with all colors which can be specified for a watermark other than the specified color (e.g., cyan and magenta to be used for electrophotography, and all colors which can be generated from red, green, blue, orange and the like to be used for inkjet printing) in the storage section 10. The watermark selecting section 40 outputs achromatic watermark data stored in the storage section 10 to the watermark composition processing section 63 when the determination result at the ACS process section 54 indicates an achromatic color, or selects watermark data associated with a specified color from watermark data associated with respective colors stored in the storage section 10 and outputs the selected watermark data to the watermark composition processing section 63 when the determination result at the ACS process section 54 indicates a chromatic color.

The above-described processing of joining an original image with a watermark may be recorded in a computer-readable recording medium 20 (see FIGS. 2 and 10), though the above description explains an example wherein the processing is stored in the ROM 1*b* as a program to be executed by a computer. In such a case, a recording medium reading apparatus and an auxiliary storage unit such as an HDD, which are not illustrated in the drawings, may be provided and the image forming apparatus may read a program from the recording medium 20 through the recording medium reading apparatus to the auxiliary storage unit, store the program in the RAM 1*c* and cause the CPU 1*a* to execute the program, or the ROM 1*b* may have a writable structure and the image forming apparatus may read the program from the recording medium 20 to the ROM 1*b*, store the program in the RAM 1*c* and cause the CPU 1*a* to execute the program. By virtue of this, the recording medium 20, in which a program code (an executable code program, an intermediate code program or a source program) for implementing the above processing is recorded, is allowed to be provided in a portable manner.

A program stored in the recording medium 20 may be constructed to be executed by an accessing microprocessor. Moreover, a program code of the program may be constructed to be read by a microprocessor, downloaded to a program storage area in a microcomputer and executed. Here, it is to be assumed that a program for the download operation is stored in advance in a main apparatus.

Here, the above recording medium 20 is a recording medium removable from the main apparatus, and may be a medium, which carries a program code in a fixed manner, including: a tape device such as a magnetic tape or a cassette tape; a disk device such as a magnetic disk (including a flexible disk and a hard disk) or an optical disk (including a CD (Compact Disk)-ROM, an MO (Magneto-Optical disk), an MD (Mini Disc) and a DVD (Digital Versatile Disc); a card device such as an IC (Integrated Circuit) card (including a memory card) or an optical card; or a semiconductor memory such as a mask ROM, an EPROM (Erasable Programmable Read Only Memory), an EEPROM (Electrically Erasable Programmable Read Only Memory) or a flash ROM.

Moreover, the image forming apparatus may be constructed to be connectable with a communication network including the Internet. In such a case, the above recording medium 20 may be a medium which carries a program code in a dynamical manner so that a program code is allowed to be downloaded from the communication network. Here, when a program is to be downloaded from the communication network as described above, a program for the download operation may be stored in advance in a main apparatus or alternatively installed from another recording medium. Here, the present invention may also be implemented in the form of a computer data signal embedded in a carrier signal, in which the above program code is implemented with electronic transmission. The above recording medium 20 is read by a program reader provided in a computer system or a digital color image forming apparatus, so that the image processing method described above is executed.

(Embodiment 2)

Figure 11:
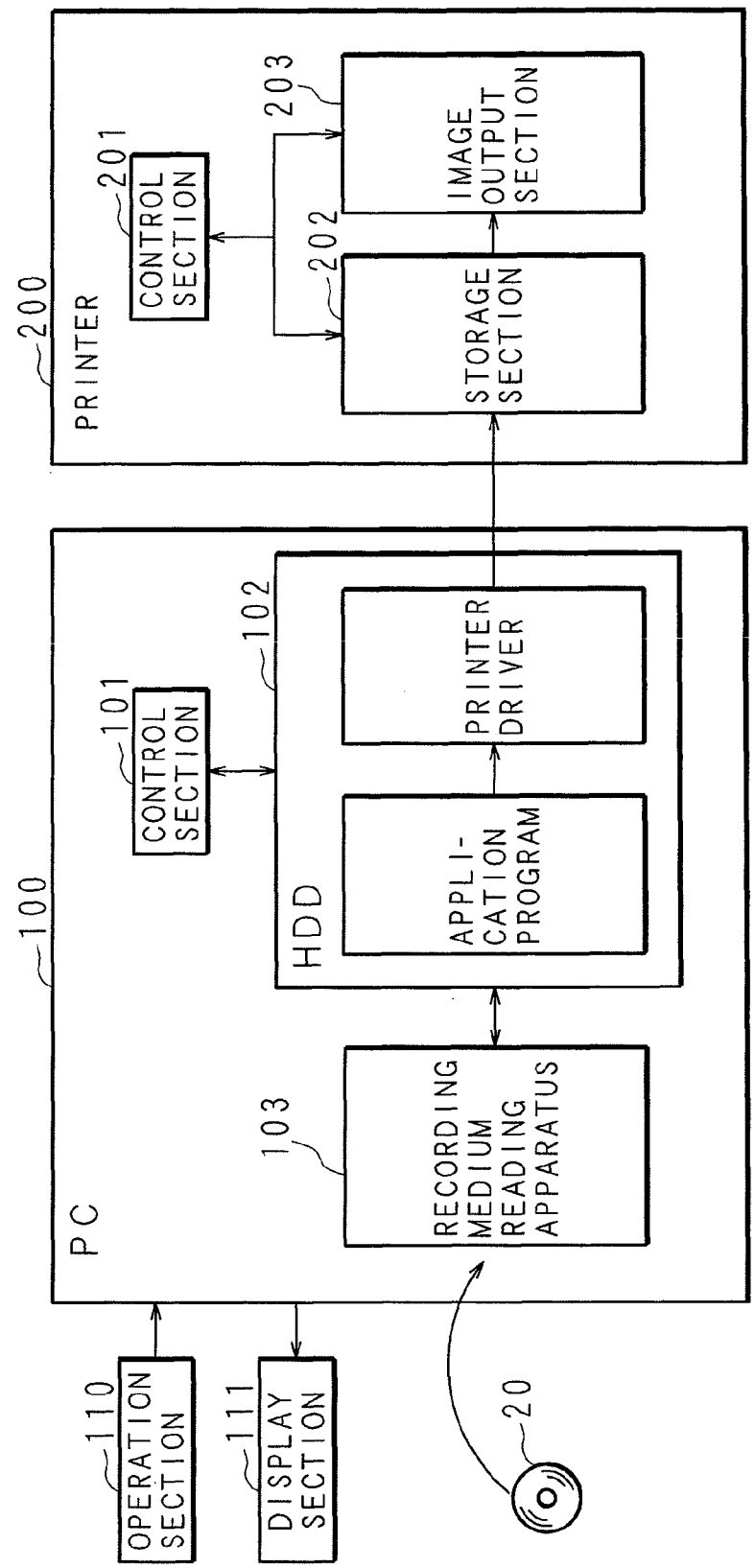
FIG. 11 is a block diagram illustrating the configuration of an image processing system according to Embodiment 2.

The following description will explain the present invention in detail with reference to the drawings illustrating an image processing system according to Embodiment 2. FIG. 11 is a block diagram illustrating the configuration of an image processing system. The image processing system is provided with a PC (Personal Computer) 100 and a printer 200 connected with the PC 100.

The PC 100 is provided with: a control section 101 having a CPU, a ROM, a RAM and the like; an HDD 102; and a recording medium reading apparatus 103 for reading information recorded in the recording medium 20. The HDD 102 has an application program for creating original image data such as a text or a graphic and a printer driver functioning as a program for configuring print setting of the printer 200, which are installed in advance from the recording medium 20 through the recording medium reading apparatus 103 to the HDD 102. The printer driver is allowed to generate watermark data and join the generated watermark data with original image data received from the application program as well as the image processing apparatus 5 according to Embodiment 1. The printer driver is also allowed to execute the processing of setting screen ruling of a pattern for generated watermark data, depending on the color (a chromatic color or an achromatic color) to be used for a watermark.

Here, the PC 100 is connected with an operation section 110 such as a keyboard or a mouse and with a display section 111 for displaying the processing result at the PC 100. The CPU of the control section 101 accepts information from the operation section 110, controls the operation of the PC 100 on the basis of a program stored in the ROM or the HDD 102, and outputs the processing result to the display section 111.

The application program to the printer driver 200 is provided with: a control section 201 having a CPU, a ROM, a RAM and the like; a storage section 202 for temporarily storing image data received from the PC 100; and an image output section 203 for forming an image on the basis of the image data and outputting the formed image. The image output section 203 is means for forming an image on a sheet such as paper or an OHP film on the basis of image data. The control section 201 controls the operation of the printer 200 on the basis of a program stored in the ROM.

When accepting an instruction of printing original image data from the operation section 110, the control section 101 of the PC 100 delivers original image data created by the application program to the printer driver. The printer driver causes the display section 111 to display an image for configuring print setting. An image of a GUI (Graphical User Interface), which includes a button to give an instruction on composition by joining an original image with a watermark, a button to select one illegal copy warning text from various kinds of illegal copy warning texts, a button to give an instruction on initiation of the print operation and the like, is displayed at the displayed section 111.

When an instruction to join original image data with watermark data is inputted from the operation section 110, the printer driver generates watermark data indicative of a default illegal copy warning text or a selected illegal copy warning text, and joins original image data with the generated watermark data. Here, the printer driver performs the processing of setting screen ruling of a pattern of a watermark depending on the color (a chromatic color or an achromatic color) to be used for a watermark as described above. When an instruction to initiate the print operation is inputted from the operation section 110, the printer driver transmits composite image data to the printer 200.

When receiving image data from the PC 100, the printer 200 stores the received image data in the storage section 202, converts the data format, and outputs the image data to the image output section 203. The image output section forms an image on the basis of the inputted image data.

Though the image processing system according to Embodiment 2 joins original image data with watermark data by the printer driver, a structure for image composition may be provided in the printer 200. In such a case, the PC 100 transmits original image data and watermark data to the printer 200 and the printer 200 joins the original image data with the watermark data.

Moreover, the present invention may have the following structure. A structure for generating watermark data may be provided in the printer 200. In such a case, the PC 100 creates original image data associated with a document or a figure by an application program and transmits the created original image data to the printer 200. The printer 200 then generates watermark data and joins the original image data transmitted from the PC 100 with the watermark data.

Moreover, the PC 100 may be constructed to be connectable with a communication network including the Internet, and a program code associated with the printer driver may be downloaded from the communication network to the HDD 102. Here, when the PC 100 downloads a program from the communication network as described above, it is to be assumed that a program for the download operation is stored in advance in the HDD 102 or alternatively installed from another recording medium.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
a processor that includes:
   a generating section configured to generate watermark data which denote a chromatic watermark and an achromatic watermark for copy control, which appear as a result of making a copy; and
   a composition section configured to generate composite image data which denote an image composed by joining an original image with a watermark, on a basis of the watermark data generated by the generating section and original image data obtained by reading an original document,
wherein the generating section includes:
   a chromatic pattern generating section configured to generate a chromatic image pattern to form a chromatic watermark; and
   an achromatic pattern generating section configured to generate an achromatic image pattern to form an achromatic watermark,
wherein the generating section generates watermark data on a basis of the chromatic image pattern generated by the chromatic pattern generating section or the achromatic image pattern generated by the achromatic pattern generating section,
wherein the chromatic image pattern includes a first chromatic image pattern, which appears as a result of making a copy,
wherein the achromatic image pattern includes a first achromatic image pattern, which appears as a result of making a copy,
wherein a spatial frequency of the first chromatic image pattern is set in low screen ruling and a spatial frequency of the first achromatic image pattern is set in high screen ruling.

2. The image processing apparatus according to claim 1,
wherein the chromatic image pattern further includes a second chromatic image pattern, which does not appear as a result of making a copy,
wherein the achromatic image pattern further includes a second achromatic image pattern, which does not appear as a result of making a copy,
wherein the first chromatic image pattern, which appears as a result of making a copy, is stored in association with the second chromatic image pattern which does not appear as a result of making a copy,
wherein the first achromatic image pattern, which appears as a result of making a copy, is stored in association with the second achromatic image pattern, which does not appear as a result of making a copy.

3. An image forming apparatus comprising:
an image processing apparatus according to claim 1; and
a printer configured to form an image on a sheet on a basis of the original image data and the watermark data, which are processed by the image processing apparatus.

4. An image processing method comprising steps of:
generating watermark data which denote a chromatic watermark and an achromatic watermark for copy control, which appear as a result of making a copy;
generating composite image data which denote an image composed by joining an original image with a watermark, on a basis of the generated watermark data and original image data obtained by reading an original document;
generating a chromatic image pattern to form a chromatic watermark;
generating an achromatic image pattern to form an achromatic watermark; and
generating watermark data on a basis of the generated chromatic image pattern or the generated achromatic image pattern,
wherein the chromatic image pattern includes a first chromatic image pattern, which appears as a result of making a copy,
wherein the achromatic image pattern includes a first achromatic image pattern, which appears as a result of making a copy,
wherein a spatial frequency of the first chromatic image pattern is set in low screen ruling and a spatial frequency of the first achromatic image pattern is set in high screen ruling.

5. A non-transitory computer-readable medium, in which a computer program is recorded,
the computer program comprising steps of:
causing a computer to generate watermark data which denote a chromatic watermark and an achromatic watermark for copy control, which appear as a result of making a copy;
causing a computer to generate composite image data which denote an image composed by joining an original image with a watermark, on a basis of the generated watermark data and original image data obtained by reading an original document;
causing a computer to generate a chromatic image pattern to form a chromatic watermark;
causing a computer to generate an achromatic image pattern to form an achromatic watermark; and
causing a computer to generate watermark data on a basis of the generated chromatic image pattern or the generated achromatic image pattern,
wherein the chromatic image pattern includes a first chromatic image pattern, which appears as a result of making a copy,
wherein the achromatic image pattern includes a first achromatic image pattern, which appears as a result of making a copy,
wherein a spatial frequency of the first chromatic image pattern is set in low screen ruling and a spatial frequency of the first achromatic image pattern is set in high screen ruling.

* * * * *